Aug. 4, 1953 S. B. WILLIAMS 2,647,997
ELECTRONIC COUNTING DEVICE
Original Filed Nov. 23, 1949
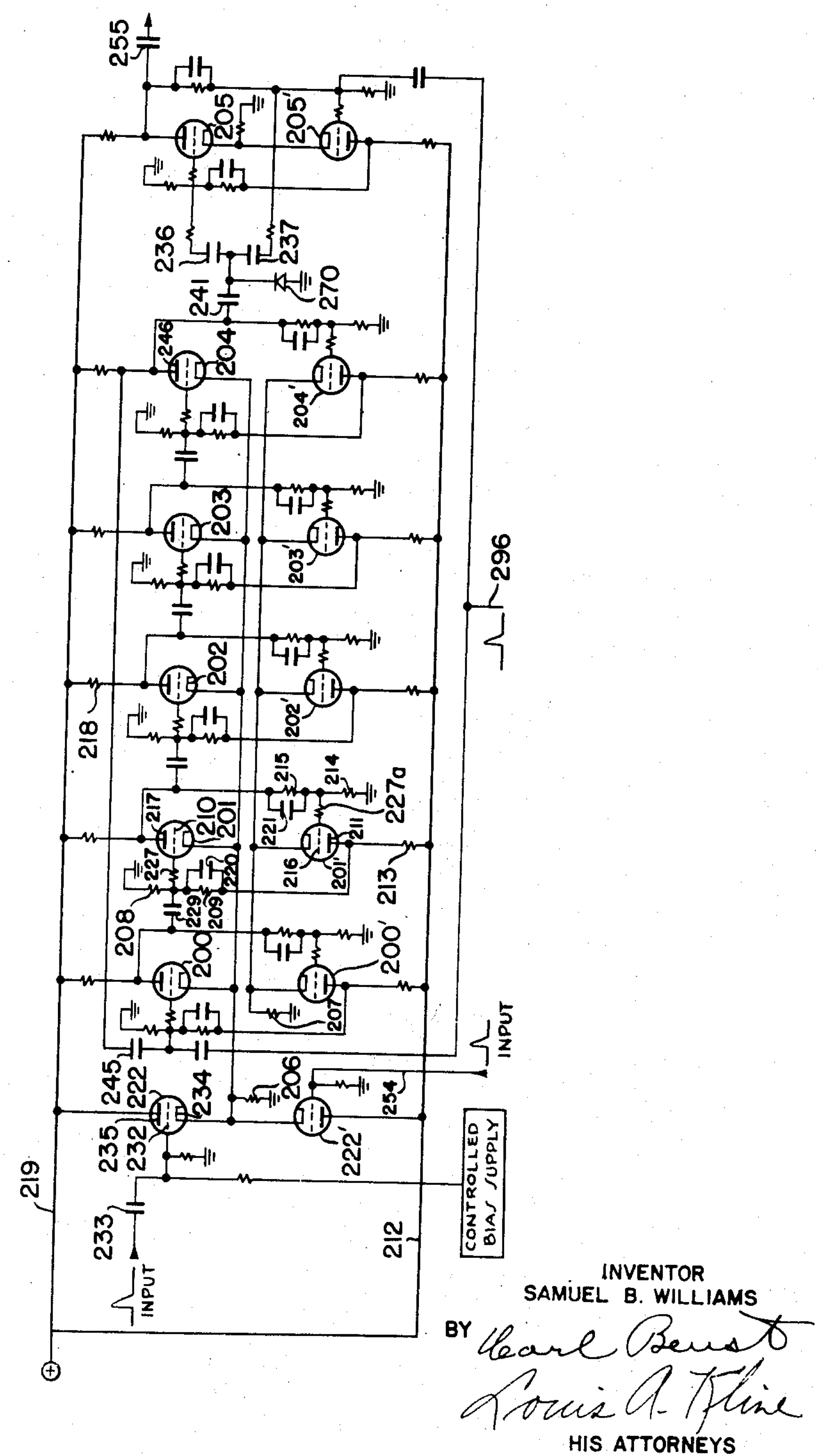
INVENTOR
SAMUEL B. WILLIAMS
BY Carl Beust
Louis A. Kline
HIS ATTORNEYS Patented Aug. 4, 1953

2,647,997

UNITED STATES PATENT OFFICE 2,647,997

ELECTRONIC COUNTING DEVICE

Samuel B. Williams, Chevy Chase, Md., assignor to The National Cash Register Company, Dayton, Ohio, a corporation of Maryland Original application November 23, 1949, Serial No. 128,985. Divided and this application November 14, 1951, Serial No. 256,275

2 Claims. (Cl. 250—27)

This invention relates to a novel electronic counter and in particular to a bi-quinary counter for counting in the decimal notation.

This application is a division of application Serial Number 128,985, which was filed on November 23, 1949.

In general, the novel counter for each denominational order contains six trigger pairs which are operable alternately to either of two stable states. Five of these trigger pairs are connected to form a quinary ring in which at any time one pair is in one of said states and the remaining four pairs are in the other of said states, and the remaining pair forms the binary portion of the counter, which is operable alternately to one and the other of the two stable states.

For the sake of explanation, one tube of each pair of the ring will be considered as the digit-representing tube, and the other tube of the pair will be considered as the mate tube. The pair which is in said one state will have its digit-representing tube conducting and its mate tube non-conducting. The stepping of the pairs of the ring, so that the pair in said one state, with its digit-representing tube conducting, progresses around the ring in response to input impulses, is accomplished from an input means or driver tube, which short-circuits all the digit-representing tubes of the ring each time an input impulse is received, the particular pair which is in said one state, upon being short-circuited, changing to its other state and in so doing generating an impulse which causes the next pair in sequence in the ring to operate to said one state as soon as the short circuit is removed.

The further trigger pair, which forms the binary portion of the order, is connected to one of the trigger pairs of the ring and is operated to change its state of operation each time the ring completes a cycle of operation. Since, in counting in the decimal notation, the ring will make two cycles of operation for each ten impulses received, the related binary trigger pair will be operated from one operating state to the other and then operated back to said one state as the ring makes two cycles of operation. Under these circumstances, each pair of the ring, when in said one operating state, can represent two decimal digits, depending on the operating status of the further, or binary, trigger pair.

The binary trigger pair is also utilized to provide an output signal for each ten input impulses which are impressed on the quinary ring. This output signal can be used to prepare a tens transfer means for operation or to operate any other desired means.

It is an object of the invention, therefore, to provide a novel bi-quinary counter.

A further object of the invention is to provide a novel stepping means for advancing the digit-representing condition of an electronic counting ring.

With these and incidental objects in view, the invention includes certain novel features of construction and combinations of parts, a preferred form or embodiment of which is hereinafter described with reference to the drawing which accompanies and forms a part of this specification.

The drawing is a circuit diagram of a representative denominational order of a counter which employs the bi-quinary notation to add decimal numbers.

In the bi-quinary notation, a decimal value is represented by the operation of two of seven elements, five quinary elements which may be numbered "0" to "4," each representing two decimal values depending upon which of two binary elements is operated, and the two binary elements, one of which represents "00" when operated and the other of which represents "5" when operated. When the "00" binary element is operated, the five quinary elements have decimal values "0" to "4." When the "5" binary element is operated, the five quinary elements have decimal values "5" to "9." The quinary elements are represented by the digit-representing tubes 200 to 204 and their mate tubes 200' to 204'. The five pairs of quinary tubes are arranged in a closed ring, the "zero" tube being tube 200. The binary elements are represented by the tubes 205 and 205' arranged in a trigger circuit. Tube 205', when conducting, represents "00" in the bi-quinary notation. Tube 205, when conducting, represents "5" in the bi-quinary notation. Thus, for example, if tubes 200 and 205' are turned on and are conducting at the same time, the decimal value of "0" is represented by "0–00" in the bi-quinary notation. If tube 205 is turned on and is conducting in place of tube 205', the decimal value of "5" is represented by "0–5" in the bi-quinary notation.

The circuit is arranged so that when tube 204, representing the quinary "4," is turned off and tube 200, representing the quinary "0," is turned on, a pulse from tube 204 triggers the binary tubes 205 and 205'. If tube 205' is on at this time, it is turned off, and tube 205 is turned on. Similarly, if tube 205 is on at this time, it is turned off, and tube 205' is turned on. Thus, a count of "five" changes the binary representation from "00" to "5" or from "5" to "00." Since a change from "0–5" to "0–00" represents a change from a decimal "9" to "0," which occurs when tube 205 is turned off and tube 205' is turned on, an output signal is generated, which may be registered for carry purposes or may be used to control some other apparatus.

The relation of the tubes to the decimal notation then becomes:

| Decimal Value | Tubes Turned On | | Bi-quinary Notation |
|---|---|---|---|
| | Quinary | Binary | |
| 0 | 200 | 205' | 0-00 |
| 1 | 201 | 205' | 1-00 |
| 2 | 202 | 205' | 2-00 |
| 3 | 203 | 205' | 3-00 |
| 4 | 204 | 205' | 4-00 |
| 5 | 200 | 205 | 0-5 |
| 6 | 201 | 205 | 1-5 |
| 7 | 202 | 205 | 2-5 |
| 8 | 203 | 205 | 3-5 |
| 9 | 204 | 205 | 4-5 |

*Operation of quinary ring*

The pairs of quinary tubes are connected in a ring circuit, and the network surrounding each pair of the tubes is the same for all. The cathodes of the digit-representing tubes 200 to 204 inclusive are connected to ground through a common resistance 206, and the cathodes of the mate tubes 200' to 204' are likewise connected through a common resistance 207 to ground to provide for the same cathode potential on all the tubes in the ring. Only one of the digit-representing tubes 200 to 204 and four of the mate tubes 200' to 204' are on at the same time. Hence, the value of resistance 207 should be one quarter the value of the resistance 206.

Each of the tubes 200—204 and 200'—204' is provided with a voltage divider. For example, tube 201 is controlled by a voltage divider composed of resistances 208 and 209, the junction of which is connected in series with resistance 227 to grid 210 of tube 201. One end of this voltage divider from resistance 208 is connected to ground, while the other end, leading from resistance 209, is connected to plate 211 of the mate tube 201'. When the potential of plate 211 is high, the potential on the grid 210 of tube 201 is high, and tube 201 is held on. Plate 211 is connected to the high-potential plate battery via conductor 212 and resistance 213.

Similarly, tube 201' is controlled through voltage divider resistances 214 and 215, the junction of which is connected through resistance 227A to grid 216 of tube 201'. Resistance 214 is connected to ground, and resistance 215 is connected to plate 217 of tube 201. The plate 217 is connected to the high-potential plate battery via anode resistance 218 and conductor 219. The voltage divider resistances 209 and 215 are bridged by condensers 220 and 221 to facilitate the operation of the tubes.

It is evident that, when a positive pulse is applied to grid 210 of tube 201, the tube will be turned on, and the potential at plate 217 is decreased. This reduces the potential on grid 216 of tube 201' through the voltage divider resistance 215, and tube 201' is turned off. When tube 201' turns off, the potential at plate 211 increases and correspondingly increases the potential on grid 210 of tube 201 through divider resistance 209. The pulse required to operate tube 201 need only be such as to start the process of turning off tube 201'. Once this process is started, the two tubes automatically adjust themselves so that tube 201 is held on by tube 201' and tube 201' is held off by tube 201.

The low resistances 227 and 227A in series with grids 210 and 216, respectively, may have values of approximately 50 ohms. They serve to prevent such parasitic high-frequency oscillations as might otherwise arise due to the wiring of the networks and tubes and do not interfere with the trigger operation of the tubes as just described. Each of the digit-representing tubes 200 to 204 and their mate tubes 200' to 204' is provided with network circuits and resistances similar to those just described for tubes 201 and 201'.

The quinary ring is operated by a driver tube 222, which has its control grid 232 normally biased from a control means, shown in the parent application but not shown in detail herein, so as to be incapable of responding to positive input impulses applied thereto over condenser 233. This control means can be operated to reduce the bias to condition the driver tube 222 for operation in response to input impulses when it is desired to make an entry in this order.

When a positive input pulse is received with the driver conditioned for operation, it will be effective to operate driver tube 222. The cathode 234 of driver tube 222 is connected to resistance 206 in common with the cathodes of the quinary ring tubes 200—204, and plate 235 is connected directly to high-potential plate battery on conductor 219. When driver tube 222 is operated, an operated quinary digit-representing tube 200 to 204 is short-circuited by driver tube 222 and turned off. For example, if digit-representing tube 200 is on, the positive pulse via condenser 233 momentarily turns on driver tube 222, which short-circuits and turns tube 200 off. When digit-representing tube 200 turns off, tube 200 turns on its mate tube 200' and also applies a positive pulse over condenser 229 to digit-representing tube 201, which is turned on. The reduced potential at plate 217 of tube 201, acting through voltage divider resistances 215 and 214, turns off mate tube 201'.

When tube 204 is turned off, tube 200 is turned on by a pulse through condenser 245. The binary tubes 205 and 205' are operated at this time. These tubes, 205 and 205', are provided with a resistance network similar to the quinary ring tubes such as 201 and 201'. The grids of tubes 205 and 205' are connected through condensers 236 and 237 and a series condenser 241 to plate 246 of tube 204. A rectifier 270 is employed to drain off any negative pulse created at the plate 246 of tube 204. Hence, each time the addition through the ring is completed and the adding passes from tube 204 to tube 200, a positive pulse is applied through condensers 241, 236, and 237 to the grids of tubes 205 and 205'. If, for example, tube 205', representing "00," is on at this time, the positive pulse is effective to turn on tube 205, and tube 205' is automatically turned off through the resistance network. Thus, on a count of five, when tube 204 is turned off and tube 200 is turned on, tube 205 will be turned on and tube 205' will be turned off. If the addition proceeds and tube 204 is turned off and tube 200 is turned on at the time that tube 205 is on, a decimal count of ten would be represented; the pulse from plate 246 of tube 204 turns on tube 205'; and tube 205 is automatically turned off. Hence, a decimal count in the adding circuit which adds up to ten or more will cause tube 205' to turn on and tube 205 to turn off.

When tube 205 is turned off, its anode potential will become more positive, and this change can be transmitted as an output signal over condenser 225 to prepare a tens transfer means or to operate some other means as desired.

A second driver tube 222', which can be conditioned in a similar manner to tube 222, can be operated by a positive pulse on conductor 254 to cause entries to be made in the counter when desired. This driver tube has its anode connected over conductor 212 to the high-potential plate battery and has its cathode connected over the resistor 206 to ground and, when conducting, will short-circuit the operated digit-representing tube 200 to 204 of the quinary ring and cause the stepping of the ring in the same manner as explained above for the operation of the ring from driver 222.

If it is desired to set the counter to its zero representation, with tubes 200 and 205' conducting, a positive impulse over conductor 296 can be impressed over suitable condensers to the grids of the tubes 200 and 205'.

In the operation of the novel counter, an input impulse applied to the driver tube 222 or 222' will cause the operated digit-representing tube 200 or 204 of the quinary ring to be short-circuited and case conducting, which in turn causes the corresponding mate tube to operate and hold the digit-representing tube in unoperated condition. The anode potential rise as the digit-representing tube becomes non-conducting is transmitted as a positive impulse to the next digit-representing tube in the ring to cause it to conduct and, in turn, cause its mate tube to become non-conducting. In this manner, conduction can be caused to occur in the successive digit-representing tubes of the quinary ring in succession.

Each time the digit-representing tube 204 is changed from its conducting status to its non-conducting status in a cycle of operation of the quinary ring, it will send a positive impulse to the binary trigger pair to reverse its operating status.

The novel counting arrangement, therefore, can count in the decimal notation, and the various digits of the notation can be represented by combinations of the conducting status of various ones of the digit-representing tubes of the quinary ring and the operating status of the binary trigger pair.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a bi-quinary electronic accumulator, the combination of a quinary portion consisting of five pairs of tubes, each pair containing a digit-representing tube and a mate tube, an operating potential supply for the digit-representing tubes, operating potential supply for the mate tubes, circuits connecting the tubes of each pair for operation as a trigger pair having two stable states, and circuits connecting the trigger pairs in a ring for operation in which one pair after another in succession will have its digit-representing tube conducting; a binary portion consisting of a pair of tubes, circuits for supplying operating potential to the pair of tubes and for connecting the tubes for operation as a trigger pair having two stable states, and a coupling between this trigger pair and a pair of the ring by which this trigger pair will be given an operation each time the pair of the ring operates; said binary portion and quinary portion combining to represent decimal amounts; input means including means in the operating potential supply for the digit-representing tubes, operable in response to input impulses to momentarily short-circuit all the digit-representing tubes in the ring to turn off any conducting digit-representing tubes; and means in the trigger circuits of the ring to enable any digit-representing tube which is turned off to send an impulse over the ring connection to cause the next digit-representing tube in sequence in the ring to conduct when the short circuit is removed therefrom.

2. In an electronic accumulator, the combination of a plurality of pairs of tubes, each pair containing a digit-representing tube and a mate tube; an operating potential supply for the digit-representing tubes; an operating potential supply for the mate tubes; circuits connecting each pair of tubes to operate as a trigger pair which is operable to either of two stable conditions; circuits connecting the trigger pairs in a ring for operation so that one pair after another will have its digit-representing tube conducting in succession; means in the operating potential supply for the digit-representing tubes, operable in response to input impulses to momentarily short-circuit all the digit-representing tubes in the ring to turn off any conducting digit-representing tube, the mate tube of the digit-representing tube which is turned off operating through the trigger circuits to maintain that digit-representing tube non-conducting; and means in the trigger circuits to enable a digit-representing tube which is turned off to send an impulse over the ring connection to cause the next digit-representing tube in sequence in the ring to conduct when the short circuit is removed therefrom.

SAMUEL B. WILLIAMS.

References Cited in the file of this patent

UNITED STATES PATENTS

| Number | Name | Date |
|---|---|---|
| 2,547,511 | Weissman | Apr. 3, 1951 |
| 2,591,007 | Rench | Apr. 1, 1952 |